(12) United States Patent
Lin

(10) Patent No.: US 7,649,757 B2
(45) Date of Patent: Jan. 19, 2010

(54) LEAKAGE-INDUCTANCE ENERGY RECYCLING CIRCUIT AND FLYBACK CONVERTER WITH LEAKAGE-INDUCTANCE ENERGY RECYCLING CIRCUIT

(75) Inventor: Chun-Liang Lin, Hsinchu (TW)

(73) Assignee: Leadtrend Technology Corp., Hsin-Chu (TW)

( * ) Notice: Subject to any disclaimer, the term of this patent is extended or adjusted under 35 U.S.C. 154(b) by 268 days.

(21) Appl. No.: 11/872,801

(22) Filed: Oct. 16, 2007

(65) Prior Publication Data

US 2009/0097281 A1    Apr. 16, 2009

(51) Int. Cl.
    H02H 7/122    (2006.01)
    H02M 3/335    (2006.01)
    H02M 7/44     (2006.01)

(52) U.S. Cl. .............. 363/56.12; 363/21.12; 363/97

(58) Field of Classification Search ............ 361/91.7; 363/21.12, 21.15, 21.18, 56.01, 56.09, 56.1, 363/56.11, 56.12, 97, 127, 131
See application file for complete search history.

(56) References Cited

U.S. PATENT DOCUMENTS 5,430,633 A * 7/1995 Smith .................... 363/20
6,477,064 B1 * 11/2002 Weng et al. ............. 363/21.04
7,061,776 B2 * 6/2006 Yang et al. .............. 363/16
7,298,631 B2 * 11/2007 Tsuruya ................ 363/21.01

* cited by examiner

Primary Examiner—Jessica Han
Assistant Examiner—Emily Pham
(74) Attorney, Agent, or Firm—Winston Hsu

(57) ABSTRACT

A flyback converter with a leakage-inductance energy recycling circuit includes a transformer and a leakage-inductance energy recycling circuit. The leakage-inductance energy recycling circuit includes a clamping circuit, an energy storage circuit, and a switch connected between the clamping circuit and the energy storage circuit. A power transistor is electrically connected to a primary winding of the transformer. The clamping circuit clamps the voltage of the power transistor at a predetermined voltage. The energy storage circuit stores the leakage-inductance energy of the primary winding. When the switch is turned off, the clamping circuit receives and stores the leakage-inductance energy of the primary winding, so as to clamp the voltage of the power transistor to a predetermined voltage; when the switch is turned on, the energy stored in the clamping circuit is stored in the energy storage circuit through the switch.

18 Claims, 5 Drawing Sheets

LEAKAGE-INDUCTANCE ENERGY RECYCLING CIRCUIT AND FLYBACK CONVERTER WITH LEAKAGE-INDUCTANCE ENERGY RECYCLING CIRCUIT

BACKGROUND OF THE INVENTION

1. Field of the Invention

The present invention relates to a flyback converter, and more particularly to a flyback converter with a leakage-inductance energy recycling circuit.

2. Related Art

FIG. 1 shows a conventional flyback converter 100, in which a DC input voltage Vin is coupled to a primary winding Lp of a transformer Tx, a power transistor Q1 and the primary winding Lp of the transformer Tx are connected in series, and the power transistor Q1 is an MOS. A controller 102 outputs a pulse width modulation signal to switch the ON and OFF of the power transistor Q1, so as to convert a DC input voltage Vi to the secondary winding Ls of the transformer Tx into an output voltage Vo through the ON or OFF of the power transistor Q1. The sensing resistor R2 and the primary winding Lp of the transformer Tx are connected in series to detect a current Ip of the primary winding.

Once the power transistor Q1 is switched from ON to OFF under the control of the pulse width modulation signal, a drain voltage Vd of the power transistor Q1 shown in FIG. 2 generates a transient high voltage at the instant when turning off the power transistor Q1, and meanwhile ripples are generated, which may result in the breakdown and damage of the power transistor Q1. In order to solve such a problem, a clamping circuit is generally disposed at the primary winding Lp of the transformer Tx.

A clamping circuit 104, electrically connected to the primary winding Lp of the transformer Tx, includes a first resistor R1 and a first capacitor C1 connected in parallel, a first end of the first resistor R1 and the first capacitor C1 is connected to a first end of the primary winding Lp of the transformer Tx, a cathode of the first diode D1 is connected to a second end of the first resistor R1 and the first capacitor C1, and an anode of the first diode D1 is connected to a second end of the primary winding Lp.

Once the power transistor Q1 is switched from On to Off under the control of the pulse width modulation signal, an energy $½L_{LK}I_P^2$ of leakage-inductance $L_{LK}$ stored in the primary winding Lp of the transformer Tx charges the parasitic capacitor Cds between a drain and a source of the power transistor Q1. After the drain voltage Vd is raised to the sum of a voltage Vc1 across two ends of the first capacitor C1 and the DC input voltage Vin, the first diode D1 is conducted, and at this time, the leakage-inductance current $L_{LLK}$ charges the first capacitor C1 through the first diode D1. In such a manner, a drain voltage Vd of the power transistor Q1 is clamped at (Vc1+Vin) by the clamping circuit, and thus preventing the power transistor Q1 from being broke-down or damaged. Next, the first diode D1 is switched to OFF due to the natural resonance, the leakage-inductance $L_{LK}$ and the stray capacitance of the circuit enters the resonance state, and the energy stored in the first capacitor C1 is discharged through the first resistor R1, and thus the energy is dissipated in the form of heat.

The power transistor Q1 is periodically turned on or off under the control of the pulse width modulation signal, so that the charge-discharge process is periodically repeated. As the energy stored in the first capacitor C1 is dissipated in the form of heat after the discharging process, there are excessive heat energy accumulated within the flyback converter, and the energy stored in the first capacitor C1 is also wasted.

SUMMARY OF THE INVENTION

In view of this, the present invention provides a leakage-inductance energy recycling circuit and a flyback converter with a leakage-inductance energy recycling circuit, which converts the leakage-inductance energy stored in the transformer into available energy through a switch and a conversion circuit at the instant when turning off the power transistor, so as to feed the energy to an accessory power supply or supply the energy to other circuits for usage, so as to clamp the working voltage of the power transistor and simultaneously convert the ineffective energy into effective energy for use, thereby improving the conversion efficiency of the flyback converter.

The leakage-inductance energy recycling circuit of the present invention is applicable for a flyback converter and includes a clamping circuit, an energy storage circuit, and a switch, in which the clamping circuit is electrically connected to a primary winding of a transformer to restrict a voltage across the power transistor at a predetermined voltage; and the switch is electrically connected between the clamping circuit and the energy storage circuit. When the switch is turned off, the clamping circuit receives and stores the leakage-inductance energy of the primary winding of the transformer; when the switch is turned on, the energy stored in the clamping circuit is released into the energy storage circuit via the switch.

The flyback converter of the present invention includes a transformer, a clamping circuit, an energy storage circuit, and a switch connected between the clamping circuit and the energy storage circuit. The transformer has a primary winding and a secondary winding, and the primary winding is electrically connected to a power transistor. The power transistor is controlled by a controller, and the controller output a pulse width modulation signal to control the ON or OFF of the power transistor. Through the ON or OFF of the power transistor, the transformer converts a DC input voltage into a DC output voltage. The clamping circuit is electrically connected to the primary winding of the transformer to a voltage across the power transistor at a predetermined voltage. The energy storage circuit stores the leakage-inductance energy of the primary winding. The switch is electrically connected between the clamping circuit and the energy storage circuit. When the switch is turned off, the clamping circuit receives and stores the leakage-inductance energy of the primary winding of the transformer to clamp the voltage of the power transistor to a predetermined voltage; when the switch is turned on, the energy stored in the clamping circuit is released into the energy storage circuit via the switch.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

The detailed features and advantages of the present invention will be described in detail below through the embodiments. Those skilled in the arts can easily understand the technical content of the present invention and make implementations accordingly. Furthermore, the embodiments are intended to further demonstrate the present invention, but not to restrict the scope of the present invention.

Figure 1:
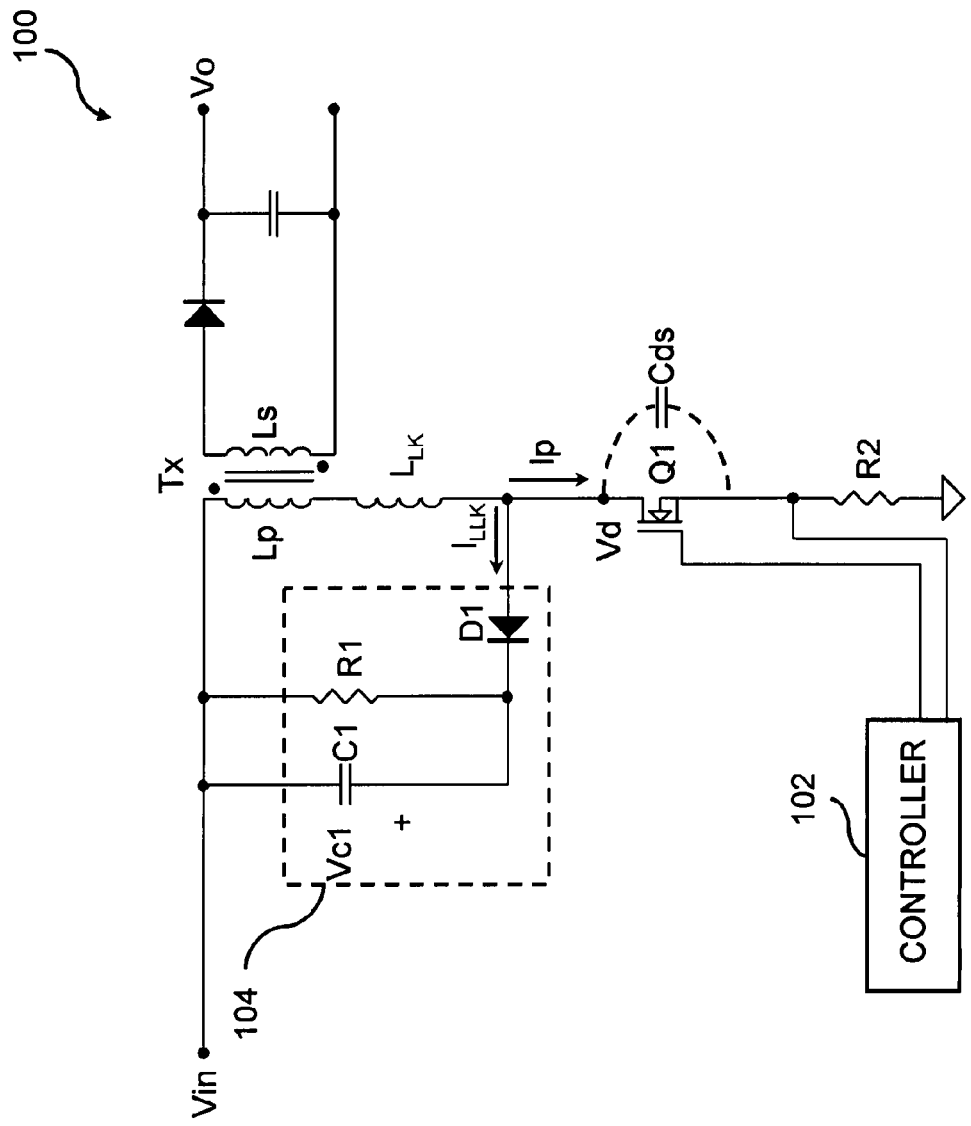
FIG. 1 is a flyback converter in the prior art.
Figure 2:
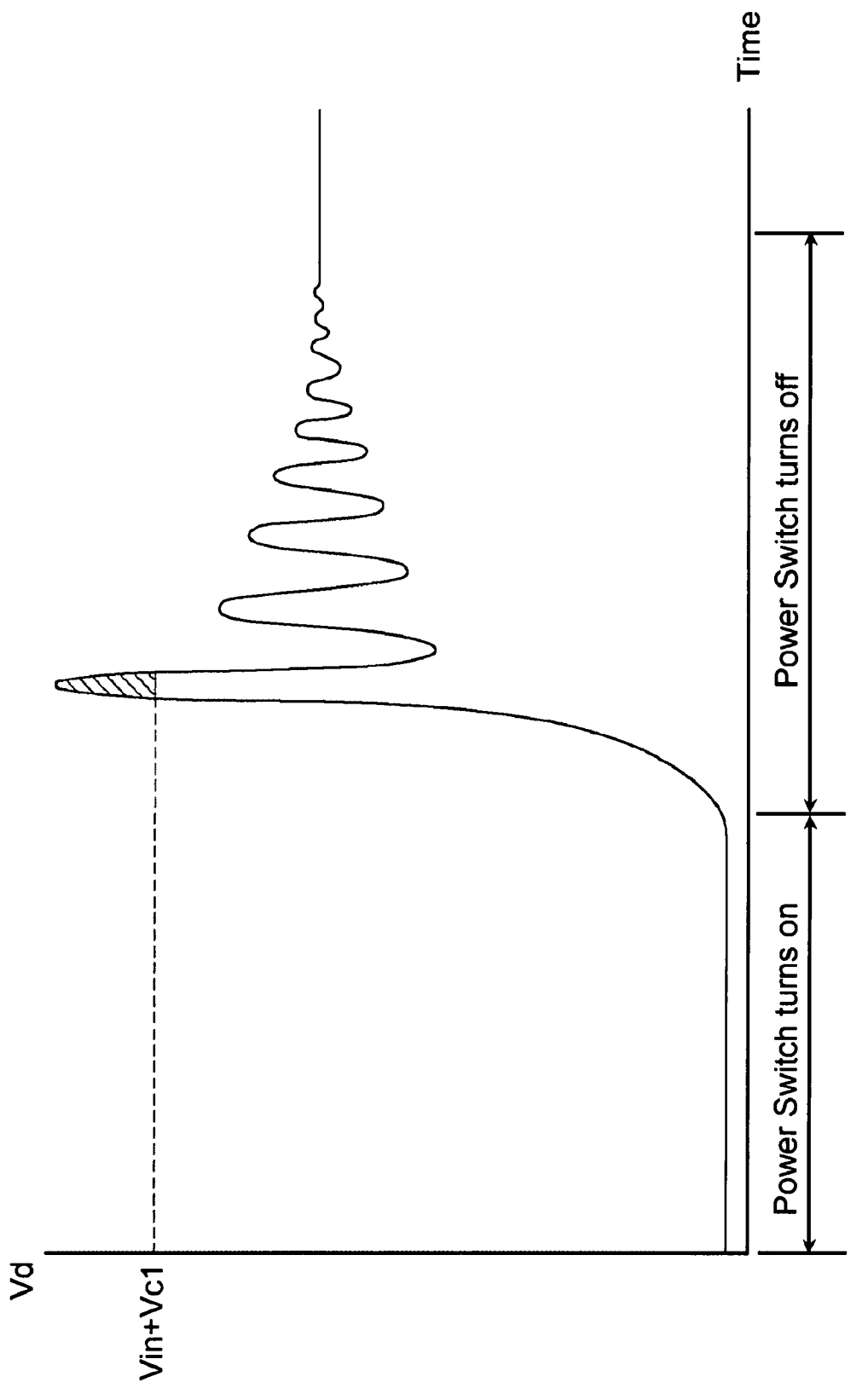
FIG. 2 shows a drain voltage at the instant when the power transistor in the flyback converter is turned off in the prior art.
Figure 3:
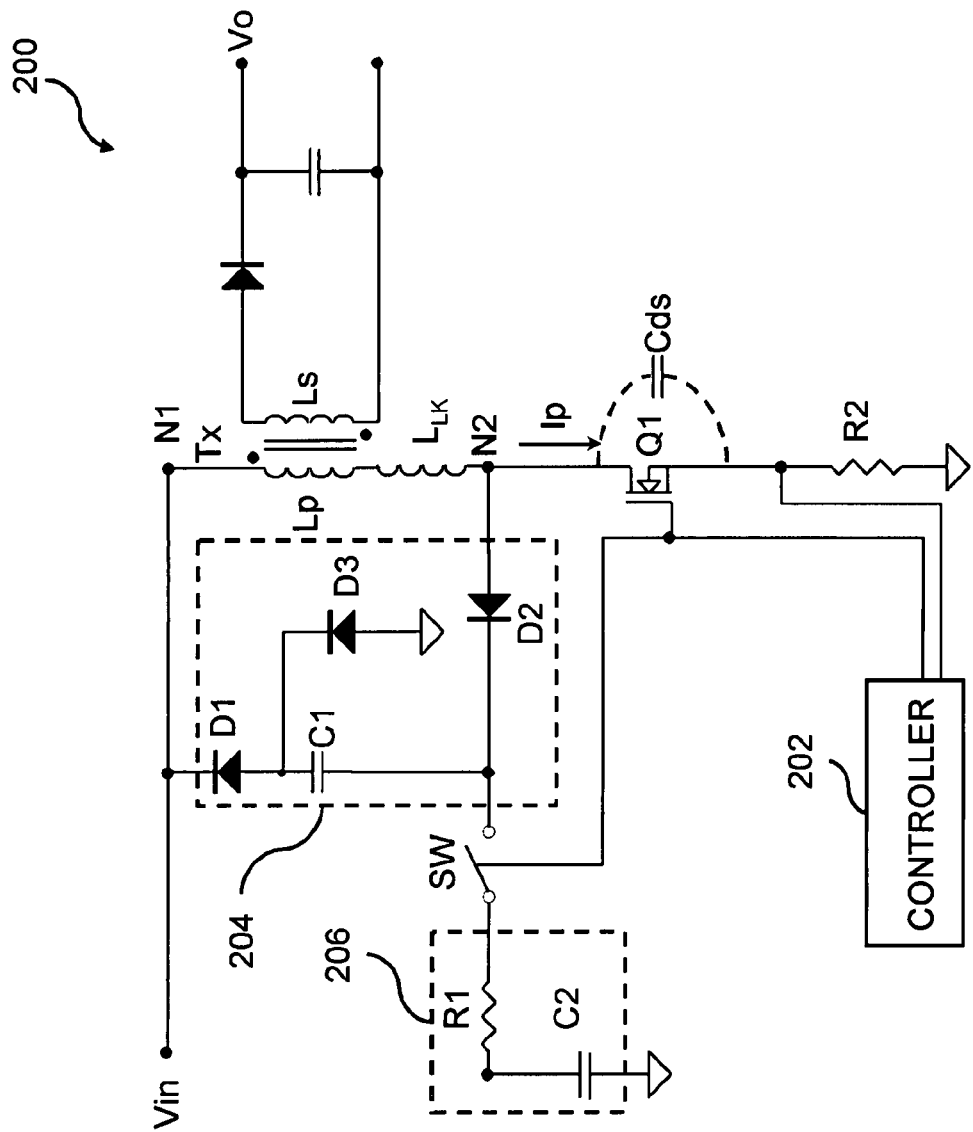
FIG. 3 is a flyback converter according to a first embodiment of the present invention.

Referring to FIG. 3, it shows a flyback converter according to a first embodiment of the present invention. A flyback converter 200 includes a transformer Tx, a clamping circuit 204, an energy storage circuit 206, and a switch SW. The clamping circuit 204 is electrically connected to a primary winding Lp of the transformer Tx. One end of the switch SW is electrically connected to the clamping circuit 204, the other end is electrically connected to the energy storage circuit 206.

The switch SW is turned on or off under the control of a pulse width modulation signal. In an embodiment, the switch SW may have the same switching cycle as the power transistor Q1, that is to say, the switch SW and the power transistor Q1 are synchronously turned on or off. In another embodiment, the switch SW is turned on or off before the power transistor Q1 is turned on or off. In an embodiment, the pulse width modulation signal can be output by the controller 202.

The clamping circuit 204 includes a first diode D1, a second diode D2, a third diode D3, and a first capacitor C1. The first diode D1, the first capacitor C1, and the second diode D2 are connected in series, in which the first capacitor C1 is electrically connected between the first diode D1 and the second diode D2. A cathode of the first diode D1 is electrically connected to a first end N1 of the primary winding Lp, an anode of the second diode D2 is electrically connected to a second end N2 of the primary winding Lp. A cathode of the third diode D3 is electrically connected between an anode of the first diode D1 and the first capacitor C1, and an anode of the third diode D3 is electrically connected to a ground terminal.

The energy storage circuit 206 includes a first resistor R1 and a second capacitor C2 that are connected in series.

In an embodiment, the flyback converter 200 further includes a controller 202 and a power transistor Q1, and the power transistor Q1 and the primary winding Lp of the transformer Tx are connected in series. The controller 202 outputs a pulse width modulation signal to switch the ON or OFF of the power transistor Q1. The DC input voltage Vin is coupled to the primary winding Lp of the transformer Tx to convert a DC input voltage Vi to the secondary winding Ls of the transformer Tx into an output voltage Vo through the ON or OFF of the power transistor Q1. A sensing resistor R2 and a primary winding Lp of the transformer Tx are connected in series, so as to detect the primary winding current Ip.

When the power transistor Q1 is switched from ON to OFF, the switch SW is turned off synchronously with or a bit earlier than the power transistor Q1, and at this time, the third diode D3 is also in an OFF state. The leakage-inductance energy stored in the primary winding Lp of the transformer Tx charges the first capacitor C1 through a first charging path formed by the second diode D2, the first capacitor C1, and the first diode D1. When the leakage-inductance energy is stored into the first capacitor C1, Vd of the power transistor Q1 is also clamped at the sum of the voltage Vc1 across two ends of the first capacitor C1 and the DC input voltage Vin, i.e., Vin+Vc1.

When the power transistor Q1 is switched from OFF to ON, the first diode D1 and the second diode D2 are turned into an OFF state. The switch SW is turned on synchronously with or a bit earlier than the power transistor Q1, and at this time, the third diode D3 is also in an ON state. Therefore, the energy stored in the first capacitor C1 charges the second capacitor C2 through a second charging path formed by the first resistor R1, so as to transfer the energy from the first capacitor C1 to the second capacitor C2. The energy transferred to the second capacitor C2 can be used as an accessory power supply or share the burden of the auxiliary power. In such a manner, the leakage-inductance energy of the primary winding Lp of the transformer Tx will not be dissipated in the form of heat energy, but stored in the second capacitor C2.

Figure 4:
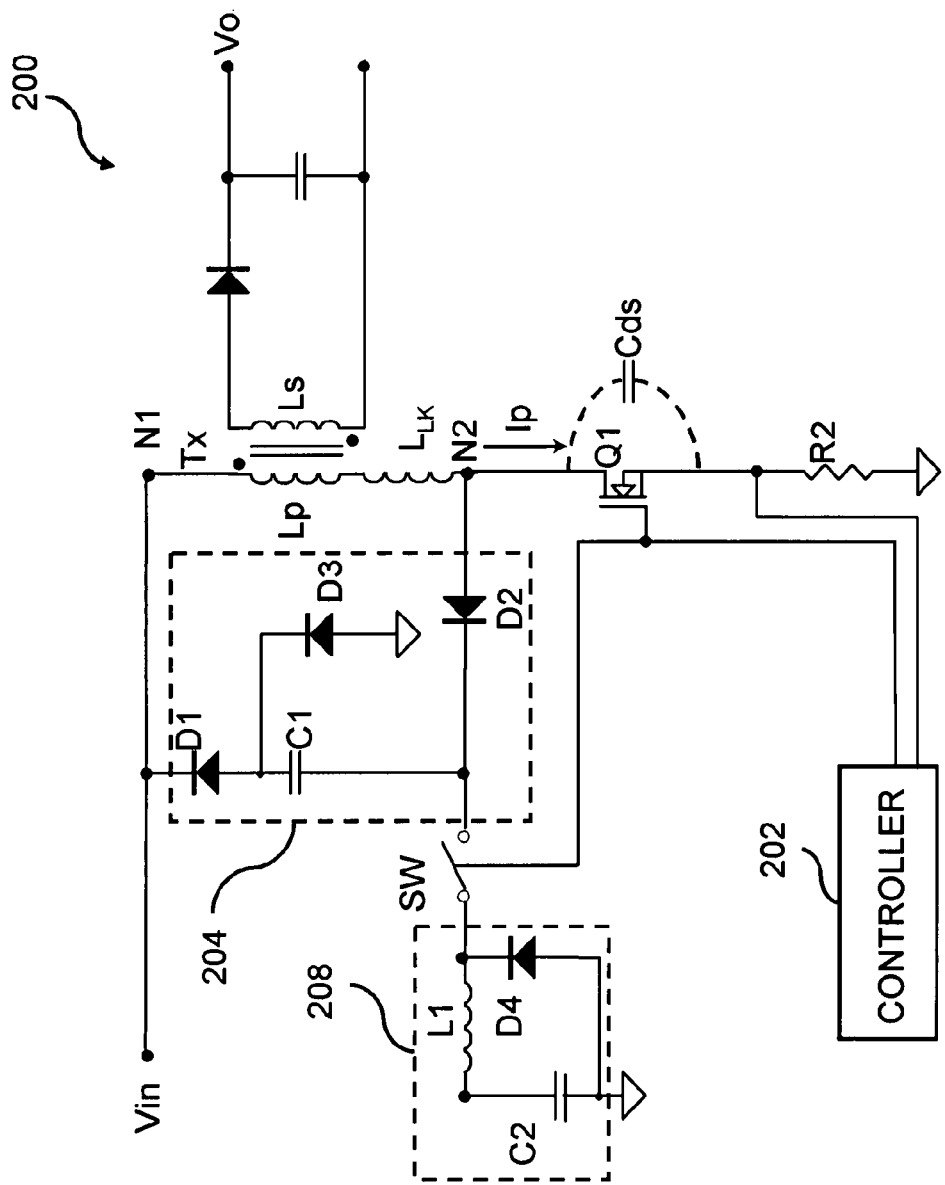
FIG. 4 is a flyback converter according to a second embodiment of the present invention.

Referring to FIG. 4, it shows a flyback converter according to a second embodiment of the present invention, in which an energy storage circuit 208 in another embodiment is shown. The energy storage circuit 208 shown in FIG. 4 includes a first inductor L1, a second capacitor C2, and a fourth diode D4. The first inductor L1 and the second capacitor C2 are connected in series, a cathode of the fourth diode D4 is electrically connected to the other end of the first inductor L1, and an anode of the fourth diode D4 is electrically connected to the other end of the second capacitor C2. When the power transistor Q1 is switched from OFF to ON, the first diode D1 and the second diode D2 are turned into the OFF state, and at this time, the third diode D3 is also in an ON state, so the energy stored in the first capacitor C1 charges the second capacitor C2 through a second charging path formed by the first inductor L1, so as to transfer the energy from the first capacitor C1 to the second capacitor C2.

Figure 5:
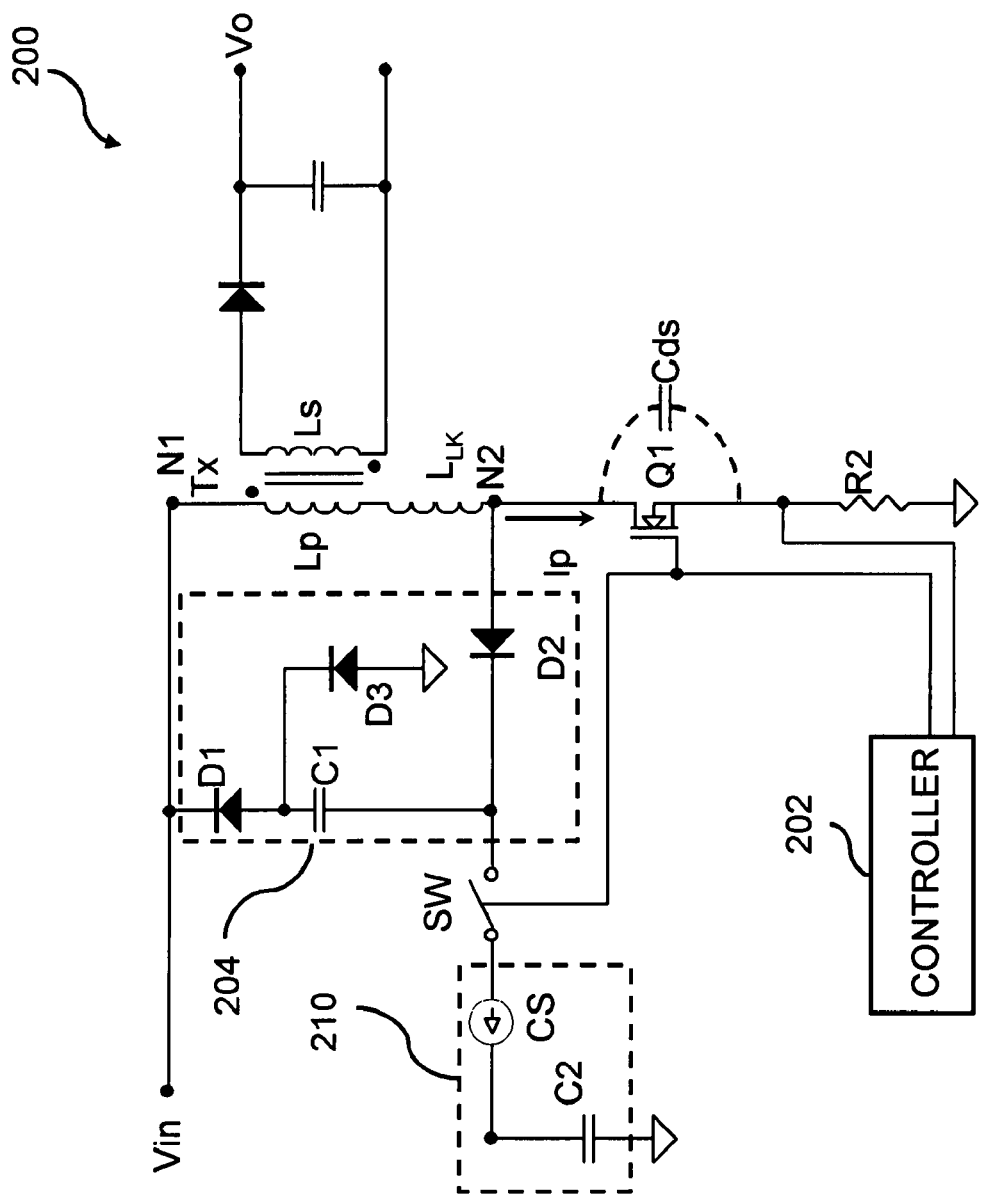
FIG. 5 is a flyback converter according to a third embodiment of the present invention.

Referring to FIG. 5, it shows a flyback converter according to a third embodiment of the present invention, in which an energy storage circuit 210 in another embodiment is shown. The energy storage circuit 210 shown in FIG. 5 includes a current source CS and a second capacitor C2. When the power transistor Q1 is switched from OFF to ON, the first diode D1 and the second diode D2 are turned into the OFF state, and at the same time, the third diode D3 is also in the ON state, so the energy stored in the first capacitor C1 charges the second capacitor C2 through a second charging path formed by the current source CS, so as to transfer the energy from the first capacitor C1 to the second capacitor C2.

The energy transferred from the first capacitor C1 to the second capacitor C2 can be supplied to the controller 202 or other integrated circuit as a power source, or alternatively, it can act as an accessory power supply to reduce the burden of the auxiliary power.

According to embodiments of the present invention, the leakage-inductance energy of the primary winding Lp of the transformer Tx can be stored in the energy storage circuit to improve the conversion efficiency of the flyback converter and to reduce the heat within the flyback converter, and thus reducing the temperature increase. On another aspect, if the stored energy can be integrated into an integrated circuit according to the circuit design in the embodiments of the present invention, an external accessory power supply can be omitted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A leakage-inductance energy recycling circuit for a flyback converter, wherein the flyback converter comprises a transformer having a primary winding and a secondary winding, the primary winding is electrically connected to a power transistor under the control of a controller, and the controller outputs a pulse width modulation signal to control ON or OFF of the power transistor, so as to enable the transformer to convert a DC input voltage into a DC output voltage through the ON or OFF of the power transistor, the leakage-inductance energy recycling circuit comprising:
 a clamping circuit, electrically connected to the primary winding of the transformer, for restricting a voltage across the power transistor at a predetermined voltage;
 an energy storage circuit; and
 a switch, electrically connected between the clamping circuit and the energy storage circuit, wherein when the switch is turned off, the clamping circuit receives and stores the leakage-inductance energy of the primary winding of the transformer; when the switch is turned on, the energy stored in the clamping circuit is released into the energy storage circuit via the switch.

2. The circuit as claimed in claim 1, wherein the clamping circuit comprises a first diode, a second diode, a third diode, and a first capacitor, wherein the first diode, the first capacitor, and the second diode are connected in series, the first capacitor is electrically connected between the first diode and the second diode, a cathode of the first diode is electrically connected to a first end of the primary winding, an anode of the second diode is electrically connected to a second end of the primary winding, a cathode of the third diode is electrically connected between an anode of the first diode and the first capacitor, and an anode of the third diode is electrically connected to a ground terminal.

3. The circuit as claimed in claim 2, wherein the predetermined voltage is the sum of the voltage across two ends of the first capacitor and the DC input voltage.

4. The circuit as claimed in claim 1, wherein the energy storage circuit comprises a first resistor and a second capacitor connected in series; when the switch is turned on, the energy stored in the clamping circuit is stored into the second capacitor via the switch.

5. The circuit as claimed in claim 1, wherein the energy storage circuit comprises a first inductor, a second capacitor, and a fourth diode, and the first inductor and the second capacitor are connected in series, a cathode of the fourth diode is electrically connected to the other end of the first inductor, an anode of the fourth diode is electrically connected to the other end of the second capacitor, when the switch is turned on, the energy stored in the clamping circuit is stored into the second capacitor via the switch.

6. The circuit as claimed in claim 1, wherein the energy storage circuit comprises a current source and a second capacitor connected in series; when the switch is turned on, the energy stored in the clamping circuit is stored into the second capacitor via the switch.

7. The circuit as claimed in claim 1, wherein the switch is controlled by the controller.

8. The circuit as claimed in claim 1, wherein the pulse width modulation signal is used to control ON or OFF of the switch.

9. The circuit as claimed in claim 1, wherein the switch and the power transistor are asynchronously turned on or off.

10. A flyback converter with a leakage-inductance energy recycling circuit, comprising:
 a transformer, having a primary winding and a secondary winding;
 a power transistor, electrically connected to the primary winding of the transformer, for enabling the transformer to convert a DC input voltage into a DC output voltage through the ON or OFF of the power transistor;
 a controller, for outputting a pulse width modulation signal to control the ON or OFF of the power transistor;
 a clamping circuit, electrically connected to the primary winding of the transformer, for restricting a voltage across the power transistor at a predetermined voltage;
 an energy storage circuit; and
 a switch, electrically connected between the clamping circuit and the energy storage circuit, wherein when the switch is turned off, the clamping circuit receives and stores the leakage-inductance energy of the primary winding of the transformer; when the switch is turned on, the energy stored in the clamping circuit is released into the energy storage circuit via the switch.

11. The flyback converter as claimed in claim 10, wherein the clamping circuit comprises: a first diode, a second diode, a third diode, and a first capacitor, wherein the first diode, the first capacitor, and the second diode are connected in series, the first capacitor is electrically connected between the first diode and the second diode, a cathode of the first diode is electrically connected to a first end of the primary winding, an anode of the second diode is electrically connected to a second end of the primary winding, a cathode of the third diode is electrically connected between an anode of the first diode and the first capacitor, and an anode of the third diode is electrically connected to a ground terminal.

12. The flyback converter as claimed in claim 11, wherein the predetermined voltage is the sum of the voltage across two ends of the first capacitor and the DC input voltage.

13. The flyback converter as claimed in claim 10, wherein the energy storage circuit comprises a first resistor and a second capacitor connected in series; when the switch is turned on, the energy stored in the clamping circuit is stored into the second capacitor via the switch.

14. The flyback converter as claimed in claim 10, wherein the energy storage circuit comprises a first inductor, a second capacitor, and a fourth diode, wherein the first inductor and the second capacitor are connected in series, a cathode of the fourth diode is electrically connected to the other end of the first inductor, an anode of the fourth diode is electrically connected to the other end of the second capacitor, and when the switch is turned on, the energy stored in the clamping circuit is stored into the second capacitor via the switch.

15. The flyback converter as claimed in claim 10, wherein the energy storage circuit comprises a current source and a second capacitor connected in series; when the switch is turned on, the energy stored in the clamping circuit is stored into the second capacitor via the switch.

16. The flyback converter as claimed in claim 10, wherein the switch is controlled by the controller.

17. The flyback converter as claimed in claim 10, wherein the pulse width modulation signal controls the ON or OFF of the switch.

18. The flyback converter as claimed in claim 10, wherein the switch and the power transistor are asynchronously turned on or off.

* * * * *